US010628965B2

(12) United States Patent
Deng et al.

(10) Patent No.: US 10,628,965 B2
(45) Date of Patent: Apr. 21, 2020

(54) SYSTEMS AND METHODS FOR ILLUMINANT-INVARIANT MODEL ESTIMATION

(71) Applicant: QUALCOMM Incorporated, San Diego, CA (US)

(72) Inventors: Yan Deng, San Diego, CA (US); Michel Adib Sarkis, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/990,469

(22) Filed: May 25, 2018

(65) Prior Publication Data
US 2019/0156515 A1    May 23, 2019

Related U.S. Application Data

(60) Provisional application No. 62/587,616, filed on Nov. 17, 2017.

(51) Int. Cl.
G06T 7/80     (2017.01)
G06T 7/73     (2017.01)
(Continued)

(52) U.S. Cl.
CPC .............. G06T 7/80 (2017.01); G06T 5/50 (2013.01); G06T 7/75 (2017.01); G06T 7/97 (2017.01); H04N 1/00 (2013.01); H04N 5/2353 (2013.01); H04N 9/045 (2013.01); G06T 2207/20208 (2013.01)

(58) Field of Classification Search
CPC .... G06T 7/97; G06T 7/75; G06T 5/50; H04N 1/00; H04N 5/2353; H04N 9/045
See application file for complete search history.

(56) References Cited

U.S. PATENT DOCUMENTS 7,804,518 B2    9/2010    Schechner et al.
8,437,537 B2    5/2013    Chang et al.
(Continued)

FOREIGN PATENT DOCUMENTS

WO    2016168307 A1    10/2016

OTHER PUBLICATIONS

Debevec P. E. et al., "Recovering High Dynamic Range Radiance Maps from Photographs", Proceeding SIGGRAPH 97, Proceedings of the 24th annual conference on Computer graphics and interactive techniques, ACM Press/Addison-Wesley Publishing Co, 1997, pp. 369-378.

(Continued)

Primary Examiner — Edward Park
(74) Attorney, Agent, or Firm — Austin Rapp & Hardman, P.C.

(57) ABSTRACT

A method is described. The method includes determining normalized radiance of an image sequence based on a camera response function (CRF). The method also includes determining one or more reliability images of the image sequence based on a reliability function corresponding to the CRF. The method further includes extracting features based on the normalized radiance of the image sequence. The method additionally includes optimizing a model based on the extracted features and the reliability images.

16 Claims, 9 Drawing Sheets

(51) Int. Cl.
*G06T 5/50* (2006.01)
*G06T 7/00* (2017.01)
*H04N 1/00* (2006.01)
*H04N 9/04* (2006.01)
*H04N 5/235* (2006.01)

(56) References Cited

U.S. PATENT DOCUMENTS

| | | | |
|---|---|---|---|
| 9,049,381 B2 | 6/2015 | Venkataraman et al. | |
| 9,607,388 B2 | 3/2017 | Lin et al. | |
| 9,998,692 B1* | 6/2018 | Griffiths | G02B 27/1066 |
| 2012/0308126 A1* | 12/2012 | Hwang | H04N 17/002 |
| | | | 382/165 |
| 2014/0267612 A1 | 9/2014 | El et al. | |
| 2015/0092075 A1* | 4/2015 | Kim | H04N 5/2355 |
| | | | 348/222.1 |
| 2015/0215623 A1* | 7/2015 | Sanders | G06T 15/50 |
| | | | 375/240.08 |
| 2016/0364847 A1* | 12/2016 | Bouzaraa | G06T 5/007 |

OTHER PUBLICATIONS

Kerl C., et al., "Robust Odometry Estimation for RGB-D Cameras," IEEE International Conference on Robotics and Automation (ICRA), 2013, pp. 3748-3754.

Li S., et al., "HDRFusion: HDR SLAM Using a Low-Cost Auto-Exposure RGB-D Sensor," International Conference on 3D Vision, Apr. 4, 2016, 16 pages.

Liu C., et al., "Noise Estimation from a Single Image," IEEE Computer Society Conference on Computer Vision and Pattern Recognition (CVPR'06), 2006, 8 Pages.

Ng T.T., et al., "Using Geometry Invariants for Camera Response Function Estimation," IEEE Conference on Computer Vision and Pattern Recognition (CVPR '07), 2007, pp. 1-8.

\* cited by examiner

SYSTEMS AND METHODS FOR ILLUMINANT-INVARIANT MODEL ESTIMATION

RELATED APPLICATIONS

This application is related to and claims priority from U.S. Provisional Patent Application Ser. No. 62/587,616, filed Nov. 17, 2017, for "SYSTEMS AND METHODS FOR ILLUMINANT-INVARIANT MODEL ESTIMATION."

TECHNICAL FIELD

The present disclosure relates generally to electronic devices. More specifically, the present disclosure relates to systems and methods for illuminant-invariant model estimation.

BACKGROUND

Electronic devices (e.g., cellular telephones, wireless modems, computers, digital music players, Global Positioning System units, Personal Digital Assistants, gaming devices, etc.) have become a part of everyday life. Small computing devices are now placed in everything from vehicles to housing locks. The complexity of electronic devices has increased dramatically in the last few years. For example, many electronic devices have one or more processors that help control the device, as well as a number of digital circuits to support the processor and other parts of the device.

Some electronic devices may be configured to solve problems by optimizing a mathematical model based on captured image sequences. For example, computer vision, machine learning, and/or image processing problems may be solved by optimizing a mathematical model based on the given RGB image sequences. However, these algorithms are usually vulnerable to illuminance changes due to the inconsistency existing in the RGB image sequences. Systems and methods that provide illuminant-invariant model estimation may therefore be beneficial.

SUMMARY

A method is described. The method includes determining normalized radiance of an image sequence based on a camera response function (CRF). The method also includes determining one or more reliability images of the image sequence based on a reliability function corresponding to the CRF. The method further includes extracting features based on the normalized radiance of the image sequence. The method additionally includes optimizing a model based on the extracted features and the reliability images.

Optimizing the model based on the extracted features and the reliability images may include estimating a camera pose based on the extracted features and the reliability images. Estimating the camera pose may include minimizing an objective function that includes the extracted features, the reliability images and a point-to-plane distance with respect to a transformation of point clouds associated with the image sequence. The objective function to estimate the camera pose may be formulated as a least square system.

Determining normalized radiance of the image sequence based on the CRF may include determining a first normalized radiance of a source image in the image sequence based on the CRF. A second normalized radiance of a target image in the image sequence may be determined based on the CRF.

Determining reliability images of the image sequence based on the reliability function corresponding to the CRF may include determining a first reliability image of the source image in the image sequence based on the reliability function. A second reliability image of the target image in the image sequence may be determined based on the reliability function.

Extracting features based on the normalized radiance of the image sequence may include extracting features from the first normalized radiance and extracting features from the second normalized radiance. Optimizing the model may be based on features extracted from the first normalized radiance and the second normalized radiance, a first reliability image associated with the first normalized radiance and a second reliability image associated with the second normalized radiance.

Optimizing the model may be further based on depth data from the image sequence. The optimal model may include, but is not limited to, one of feature matching, homography estimation, image registration, object segmentation or object detection.

An electronic device is also described. The electronic device includes a memory and a processor in communication with the memory. The processor is configured to determine normalized radiance of an image sequence based on a camera response function (CRF). The processor is also configured to determine one or more reliability images of the image sequence based on a reliability function corresponding to the CRF. The processor is further configured to extract features based on the normalized radiance of the image sequence. The processor is additionally configured to optimize the model based on the extracted features and the reliability images.

Another method is described. The method includes automatically determining a free parameter (lambda) used to estimate a camera response function (CRF). The method also includes determining the CRF based on the lambda. The method further includes determining a reliability function corresponding to the CRF.

The lambda may be a free parameter in an objective function used for determining the CRF. The lambda may be determined based on information from one or more images.

Automatically determining the lambda may include determining a CRF for multiple lambda values. A lambda may be chosen from the multiple lambda values that leads to a minimum residual of the CRF.

Automatically determining the lambda may include calculating a CRF for multiple lambda values using intensity information from one or more images. Lambda results that produce a monotonically increasing CRF may be kept. A lambda may be chosen from the lambda results that leads to a minimum residual of the CRF.

Determining the CRF may include minimizing an objective function that includes the lambda with respect to the CRF.

In some implementations, multiple images at different exposure levels from an adjustable-exposure camera may be used to determine the lambda and the CRF. In other implementations, a single image from a single-exposure camera may be used to determine the lambda and the CRF.

The automatic lambda determination mechanism may be used in a high-dynamic-range (HDR) based application.

An electronic device is also described. The electronic device includes a memory and a processor in communication with the memory. The processor is configured to automatically determine a free parameter (lambda) used to estimate a camera response function (CRF). The processor is also configured to determine the CRF based on the lambda. The processor is further configured to determine a reliability function corresponding to the CRF.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
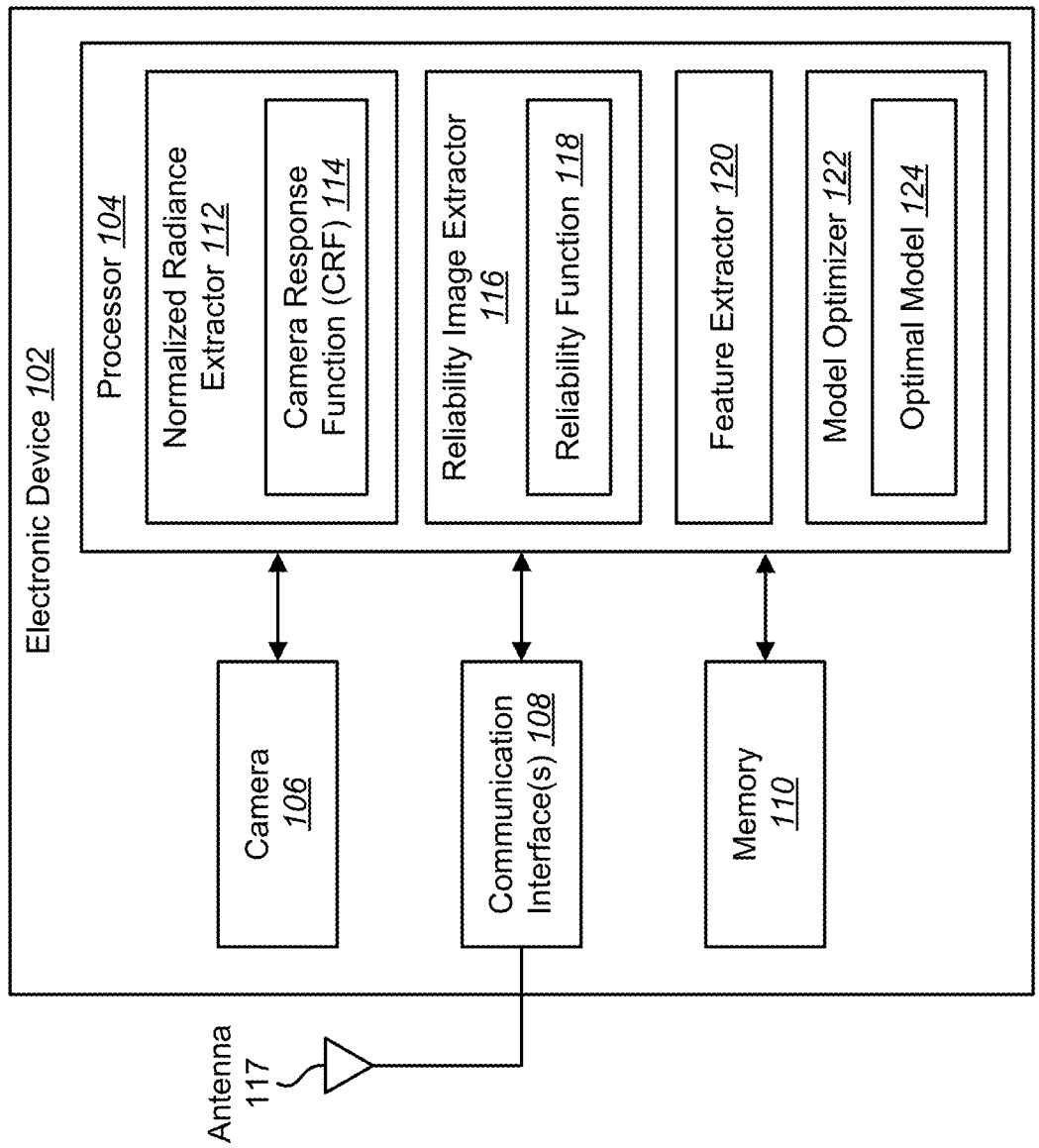
FIG. 1 is a block diagram illustrating one example of an electronic device in which systems and methods for illuminant-invariant model estimation may be implemented.

FIG. 1 is a block diagram illustrating one example of an electronic device 102 in which systems and methods for illuminant-invariant model estimation may be implemented. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, appliances, three-dimensional (3D) scanners, etc.

The electronic device 102 may include one or more components or elements. One or more of the components or elements may be implemented in hardware (e.g., circuitry) or a combination of hardware and software and/or firmware (e.g., a processor 104 with instructions).

The electronic device 102 may be configured to perform illuminant-invariant model estimation. Currently, many computer vision, machine learning, and image processing problems are solved by optimizing a mathematical model based on image sequences (e.g., red, green and blue (RGB) image sequences). For example, a 3D scanner may use images captured by a camera 106 to create a 3D model (also referred to as a 3D reconstruction) of an environment or objects in an environment.

However, these image processing algorithms are vulnerable to changes in illuminance due to the inconsistency existing in the image sequences. As used herein "illuminance" refers to the luminous flux incident on a surface. Illuminance is a measure of how much an incident light illuminates a surface (e.g., camera sensor). Also, as used herein, "illuminant" refers to a means of lighting or a source of light.

In an example, 3D reconstruction systems (also referred to as 3D scanners) are vulnerable to extreme illuminant conditions. In general, these 3D reconstruction systems use RGB images, which may also include RGBD (RGB image and depth) input. In an application, the 3D reconstruction systems may track features as in monocular simultaneous localization and mapping (SLAM). The RGB images may be subject to extreme illuminant conditions, which may include over- and under-exposure. In an example, if a person sitting beside a window on a very sunny day is scanned by a 3D scanner, the 3D reconstruction system may fail to give an accurate result when images captured by the 3D scanner are over-exposed.

Similar problems exist for other image processing applications that are subject to extreme illuminant conditions. These applications may include, but are not limited to, feature matching, homography estimation, image registration, object segmentation, object detection, etc.

The systems and method described herein provide for illuminant-invariant feature extraction that is more robust to changes in the illuminant environment. Various model estimation systems are also described that benefit from of the extracted illuminant-invariant features.

In some configurations, the electronic device 102 may include a processor 104, a memory 110, one or more cameras 106, and/or one or more communication interfaces 108. The processor 104 may be coupled to (e.g., in electronic communication with) the memory 110, camera(s) 106, and/or communication interface(s) 108.

The processor 104 may be a general-purpose single- or multi-chip microprocessor (e.g., an Advanced RISC Machine (ARM)), a special-purpose microprocessor (e.g., a digital signal processor (DSP)), a microcontroller, a programmable gate array, etc. The processor 104 may be referred to as a central processing unit (CPU). Although just a single processor 104 is shown in the electronic device 102, in an alternative configuration, a combination of processors 104 (e.g., an Image Signal Processor (ISP) and an application processor, an ARM and a DSP, etc.) could be used. The processor 104 may be configured to implement one or more of the methods disclosed herein. For example, the processor 104 may be configured to illuminant-invariant model estimation.

The communication interface(s) 108 may enable the electronic device 102 to communicate with one or more other electronic devices 102. For example, the communication interface(s) 108 may provide an interface for wired and/or wireless communications. In some configurations, the communication interface(s) 108 may be coupled to one or more antennas 117 for transmitting and/or receiving radio frequency (RF) signals. Additionally or alternatively, the communication interface(s) 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), Code Division Multiple Access (CDMA), etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface 108 may send information (e.g., image information, surround view information, etc.) to and/or receive information from another electronic device 102 (e.g., a vehicle, a smart phone, a camera, a display, a remote server, etc.).

The electronic device 102 may obtain one or more images (e.g., digital images, image frames, video, etc.) and other sensor data (e.g., depth data) from which the electronic device 102 may perform illuminant-invariant model estimation. For example, the electronic device 102 may include one or more camera(s) 106 (e.g., normal cameras, wide-angle cameras, fisheye cameras, etc.). Additionally or alternatively, the electronic device 102 may request and/or receive the one or more images from another device (e.g., one or more external cameras coupled to the electronic device 102, a network server, traffic camera(s), drop camera(s), vehicle camera(s), web camera(s), etc.).

The processor 104 may include a normalized radiance extractor 112. One or more of the images may be provided to the normalized radiance extractor 112. In some configurations, the normalized radiance extractor 112 may operate in accordance with one or more of the approaches, functions, procedures, steps and/or structures described in connection with one or more of FIGS. 1-9. The normalized radiance extractor 112 may obtain images from the one or more cameras 106.

In some implementations, the normalized radiance extractor 112 may receive image data from a single camera 106 or multiple cameras 106 and/or from one or more external cameras. The images may be captured from multiple cameras (at different locations, for example). As described above, the image(s) may be captured from the camera(s) 106 included in the electronic device 102 or may be captured from one or more remote camera(s).

In some implementations, a single camera 106 may move to different locations while capturing images of a stationary object and/or user. For example, a camera 106 may move around the object and/or user to observe different viewpoints or poses of the object and/or user.

In other implementations, a camera 106 may be stationary and an object and/or user may move within the field of view of the camera 106. For example, an object and/or user being scanned may move to different poses as observed by the camera 106.

In some configurations, the normalized radiance extractor 112 may request and/or receive one or more images. For example, the normalized radiance extractor 112 may request and/or receive one or more images from a remote device (e.g., external camera(s), remote server, remote electronic device, etc.) via the communication interface(s) 108.

The normalized radiance extractor 112 may receive an image sequence as captured by the one or more cameras 106. As used herein, an image sequence may be a series of two or more images. In some implementations, the image sequence may include consecutive (e.g., successive) images.

In other implementations, the image sequence may include a subset of received images (e.g., every other image, every 3 images, etc.).

A captured image may be made up of a number of pixels. Each pixel may have a certain intensity (which may also be referred to as I) as determined by the camera sensor of the camera 106. Lower intensities may appear dark (e.g., black) and higher intensities appear light (white). The intensity value may represent the number of photons detected by the camera sensor at a specific location of the camera sensor.

The intensity of a pixel may be related to the radiance (R) of the pixel via a camera response function (CRF) 114. The CRF 114 is a nonlinear mapping between the intensity (I) of a pixel and the radiance (R) of the pixel. In general, $I=f(R+n_s(R)+n_c)+n_q$, $R=L\Delta t$, where I is the intensity, R is the radiance, L is the illuminance, $f$ is a nonlinear function, and $n_s$, $n_c$, $n_q$ are noises contained in the CRF 114 for exposure time t.

The normalized radiance extractor 112 may determine a normalized radiance ($\overline{R}$) of pixels in an image sequence based on the camera response function (CRF) 114. As described above, radiance (R) may be defined as the energy of the light at the camera sensor. The electronic device 102 may include a CRF 114 that is calibrated for a given camera 106. The CRF 114 may provide a radiance (R) value for a given pixel for an input intensity (I) of the given pixel. For each pixel, the normalized radiance ($\overline{R}$) may be calculated according to Equation (1).

$$\overline{R} = \frac{R - E(R)}{\sigma(R)} \qquad (1)$$

In Equation (1), R is the radiance of a given pixel as determined by the CRF 114 for the intensity of the given pixel. E(R) is the mean of the radiances (R) for each pixel in a pixel-centered neighborhood. As used herein a pixel-centered neighborhood includes a number of pixels in a region of the given pixel. The pixel-centered neighborhood may or may not include the given pixel. For example, a 4-neighbors region may include the four pixels immediately above, below, left and right of the given pixel. Other pixel-centered neighborhoods may include an 8-neighbors region (e.g., the 8 pixels that are immediately orthogonal and diagonal to the given pixel), a 16-neighbors region, etc. Therefore, E(R) is the summation of radiances (R) as determined by the CRF 114 for each pixel in a pixel-centered neighborhood divided by the number of pixels in the pixel-centered neighborhood. In Equation (1), σ(R) is the standard deviation of the radiances (R) for the pixels in the pixel-centered neighborhood.

In an implementation, the normalized radiance extractor 112 may determine the normalized radiance for each pixel via the aforementioned algorithm in a source image (e.g., a first RGB image or grayscale image) and a target image (e.g., a second RGB image or grayscale image) in an image sequence. It should be noted that the source image and the target image may or may not be consecutive images in the image sequence.

The collection of the normalized radiance determined for each of the pixels in an image may be referred to as a normalized radiance image. In other words, a normalized radiance image depicts the normalized radiance of a captured image. Each pixel in the normalized radiance image may have a certain normalized radiance as determined according to Equation (1). The normalized radiance image of the source image may be referred to as $\overline{R}^l$. The normalized radiance image of the target image may be referred to as $\overline{R}^r$. Examples of the first and second normalized radiance images are described in connection with FIG. 4.

The processor 104 may also include a reliability image extractor 116. The reliability image extractor 116 may determine reliability images of the image sequence based on a reliability function (p) 118 corresponding to the CRF 114. The electronic device 102 may include a reliability function (p) 118 that provides a reliability probability of the determined radiance (R) of a given pixel based on the intensity of the given pixel. In other words, the reliability function (p) 118 provides a probability of the validity of a radiance (R) as determined from the CRF 114 using the intensity of a given pixel. The reliability function (p) 118 may be derived from the CRF 114.

Because the normalized radiance ($\overline{R}$) of a pixel is determined from the radiance (R) of the given pixel (in accordance with Equation (1), for instance), the reliability probability given by the reliability function (p) 118 also indicates the reliability of the normalized radiance ($\overline{R}$) of a given pixel. A high probability indicates that the pixel's normalized radiance is reliable, while low probability indicates that the pixel's normalized radiance is not reliable.

A reliability image (P) includes the reliability of the radiance (R) of the pixels in an image. For each pixel in an image (e.g., RGB image), the reliability image extractor 116 may determine a corresponding probability based on the reliability function 118. Because the reliability function (p) 118 is associated with the CRF 114, the reliability image (P) may indicate the reliability of the normalized radiance ($\overline{R}$) of pixels in the image. An example of a CRF 114 and an associated reliability function (p) 118 is described in connection with FIG. 7.

In an implementation, the reliability image extractor 116 may determine a first reliability image ($P^l$) for the first image and a second reliability image ($P^r$) for the second image. Examples of the first and second reliability images are described in connection with FIG. 4.

The processor 104 may also include a feature extractor 120. The feature extractor 120 may extract features based on the normalized radiance. The feature extraction may be a feature extraction mapping or even multiple feature extraction functions. For example, the feature extractor 120 may be a variant of speeded up robust features (SURF), binary robust invariant scalable keypoints (BRISK), Oriented FAST and rotated BRIEF (ORB), histogram of oriented gradients (HOG), normalized cross-correlation (NCC), scale-invariant feature transform (SIFT), etc. One possible implementation of the feature extractor 120 is a combination of tone mapping and normal difference of Gaussian (DoG)-based feature extraction. For a machine learning-based feature extractor, re-training on the normalized radiance data may be required.

In an implementation, the feature extractor 120 may extract features from the first normalized radiance image ($\overline{R}^l$). The feature extractor 120 may also extract features from the second normalized radiance image ($\overline{R}^r$).

The processor 104 may also include a model optimizer 122. The model optimizer 122 may optimize a mathematical model 124 based on the extracted features and the reliability images. For example, the features extracted from the normalized radiance and the associated reliability image(s) derived from the image stream may be used to optimize a mathematical model among the image sequences (or model within a single image). The optimal model 124 may include, but is not limited to, feature matching, homography estimation, image registration, a discriminative model (e.g., object segmentation, object detection), etc. Model estimation for several different types of models is discussed in connection with FIG. 3.

In an implementation, the model optimization may be based on the features extracted from two or more normalized radiances and the associated reliability images. For example, the model optimization may be based on the features extracted from the first normalized radiance image ($\overline{R}^l$), the first reliability image ($P^l$), the second normalized radiance image ($\overline{R}^r$) and the second reliability image ($P^r$). When determining the optimal model 124, the extracted features may be weighted by their corresponding reliability image. For example, in regions with low reliability, the influence of the extracted features may be minimized.

The model optimization may also be based on other available information. For example, in the case of RGBD images, depth data may be provided to the model optimizer 122.

Figure 2:
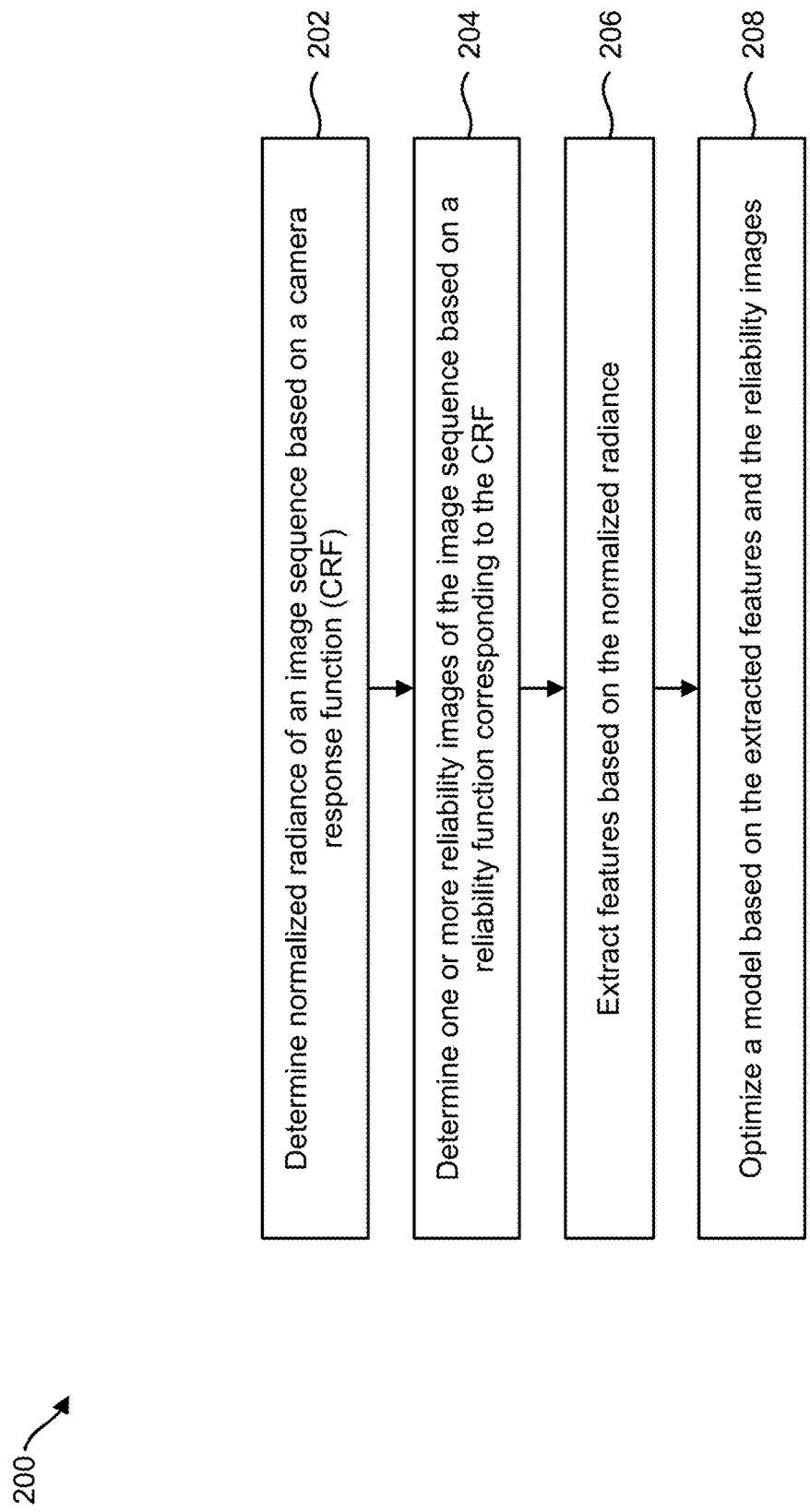
FIG. 2 is a flow diagram illustrating one configuration of a method for illuminant-invariant model estimation.

FIG. 2 is a flow diagram illustrating one configuration of a method 200 for illuminant-invariant model estimation. The method 200 may be performed by an electronic device 102 as described in connection with FIG. 1.

The electronic device 102 may determine 202 a normalized radiance of an image sequence based on a camera response function (CRF) 114. For example, the electronic device 102 may determine a first normalized radiance of a source image in the image sequence based on the CRF 114. The electronic device 102 may also determine a second normalized radiance of a target image in the image sequence based on the CRF 114.

The electronic device 102 may determine 204 one or more reliability images of the image sequence based on a reliability function (p) 118 corresponding to the CRF 114. The electronic device 102 may be configured with a reliability function (p) 118 that indicates the reliability of the estimated normalized radiance ($\overline{R}$) of a given pixel from the intensity of the given pixel in an image. The reliability function (p) 118 may be based on a noise estimation of the CRF 114. For example, $$p(I) = \frac{1}{m} \frac{\partial f(r)}{\partial r}\bigg|_{r=R} \sqrt{R\sigma_s^2 + \sigma_c^2},$$

where $f$ is the inverse of the CRF 114, $$\frac{\partial f(r)}{\partial r}$$

is the partial derivative of $f$ with respect to a function variable r, R is the estimated radiance as determined by the CRF 114 from the intensity (I) $\sigma_s$ is noise in the CRF related to R, $\sigma_c$ is noise in the CRF not related to R, and m is a normalization term.

In some implementations, the electronic device 102 may determine a first reliability image of the source image in the image sequence based on the reliability function 118. The electronic device 102 may also determine a second reliability image of the target image in the image sequence based on the reliability function 118. In other implementations, the electronic device 102 may determine a single reliability image of the target image (e.g., a second RGB image or grayscale image in the image sequence).

The electronic device 102 may extract 206 features based on the normalized radiance of the image sequence. For example, the electronic device 102 may extract features from the first normalized radiance. The electronic device 102 may also extract features from the second normalized radiance. The feature extraction may be a single feature extraction mapping or even multiple feature extraction functions, such as SURF, BRISK, ORB, HoG, NCC, etc.

The electronic device 102 may optimize 208 a model 124 based on the extracted features and the reliability images. For example, the optimal model 124 may be based on the extracted features (from the first normalized radiance and the second normalized radiance) and the reliability image(s) from the first reliability image associated with the first normalized radiance and/or the second reliability image associated with the second normalized radiance.

In an implementation, optimizing the model 124 may include estimating a camera pose based on the extracted features and the reliability image(s). For example, the camera pose may be estimated by minimizing an objective function that includes the extracted features and a reliability image of the target image with respect to a transformation of the image sequence. In some implementations, the camera pose may be estimated by minimizing an objective function that also includes a point-to-plane distance. An example of camera pose estimation is described in connection with FIG. 5.

In another implementation, the optimal model 124 may include one of feature matching, homography estimation, image registration, object segmentation or object detection. Examples of model optimization used for various image processing applications are described in connection with FIG. 3.

Figure 3:
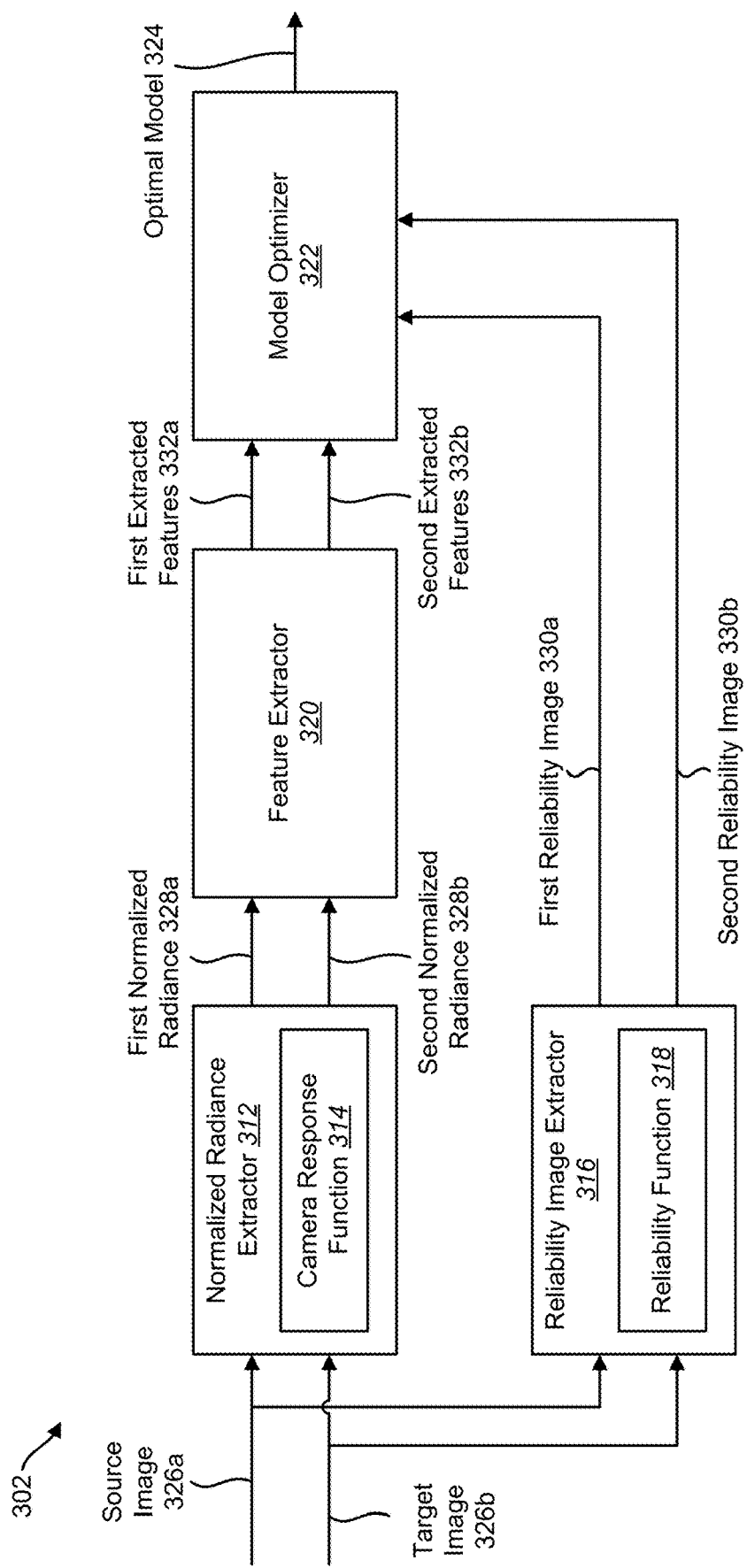
FIG. 3 is a block diagram illustrating an implementation of an electronic device configured to perform illuminant-invariant model estimation.

FIG. 3 is a block diagram illustrating an implementation of an electronic device 302 configured to perform illuminant-invariant model estimation. The electronic device 302 described in connection with FIG. 3 may be implemented in accordance with the electronic device 102 described in connection with FIG. 1.

An electronic device 302 may capture a source image 326a and a target image 326b in an image sequence. For example, the electronic device 302 may include one or more cameras (not shown in FIG. 3) that capture an image stream (e.g., a sequence of RGB images, grayscale images, or images of other formats). The source image 326a and the target image 326b may or may not be consecutive images in the image stream.

A normalized radiance extractor 312 may receive the source image 326a and the target image 326b. The normalized radiance extractor 312 may determine a first normalized radiance ($\bar{R}^l$) 328a for the source image 326a based on a camera response function (CRF) 314. The normalized radiance extractor 312 may determine a second normalized radiance ($\bar{R}^r$) 328b for the target image 326b based on the CRF 314.

A feature extractor 320 may receive the first normalized radiance ($\bar{R}^l$) 328a and the second normalized radiance ($\bar{R}^r$) 328b. The feature extractor 320 may extract features from the first normalized radiance ($\bar{R}^l$) 328a and the second normalized radiance ($\bar{R}^r$) 328b. The feature extractor 320 may extract first extracted features 332a from the first normalized radiance ($\bar{R}^l$) 328a. The feature extractor 320 may extract second extracted features 332b from the second normalized radiance ($\bar{R}^r$) 328b.

The feature extraction may be feature extraction mapping or even multiple feature extraction functions, such as SURF, BRISK, ORB, HoG, NCC, etc. The feature extraction mapping may be dense or sparse. The feature extraction mapping may be represented as H(g$\eta$), where "g" is input to the feature extraction mapping and $\eta$ stands for free parameters associated with a given feature extraction mapping (e.g., window size, bin size, directions of neighbors, noises, etc.). In an implementation, the feature extractor 320 may determine one or more feature vectors for a given image 326.

A reliability image extractor 316 may determine reliability images of the image sequence based on a reliability function 318 corresponding to the CRF 314. The reliability image extractor 316 may determine a first reliability image ($P^l$) 330a corresponding to the source image 326a. The reliability image extractor 316 may also determine a second reliability image ($P^r$) 330b corresponding to the target image 326b.

A model optimizer 322 may optimize a mathematical model 324 based on the first extracted features 332a, the second extracted features 332b, the first reliability image ($P^l$) 330a, and the second reliability image ($P^r$) 330b. A general model 324 may be expressed according to Equation (2):

$$\xi^* = \arg\max \xi p\{H(\bar{R}^r,\eta)H(\bar{R}^l,\eta),P^r,P^l,\tau|\xi\}\text{Prior}(\xi). \quad (2)$$

Equation (2) is a Bayesian model conditioned on a function variable $\xi$. $H(\bar{R}^r,\eta)$ is the feature extraction mapping based on the second normalized radiance ($\bar{R}^r$) 328b, $H(\bar{R}^l,\eta)$ is the feature extraction mapping based on the first normalized radiance ($\bar{R}^l$) 328a, $P^l$ is the first reliability image 330a and $P^r$ is the second reliability image 330b. This model is constructed based on the observed distribution $H(\bar{R}, \eta)$, P and other available information $\tau$. Also, p is the observed distribution of $H(\bar{R},\eta)$, P and $\xi^*$ is the resulted optimal $\xi$. The optimal model 324 may be determined by maximizing the posterior probability. In Equation (2), Prior($\xi$) is the distribution resulted from prior knowledge.

Another general model 324 is distance based as expressed in Equation (3):

$$\xi^* = \arg\max \xi \text{dist}\{H(\bar{R}^r,\eta)H(\bar{R}^l,\eta)|\xi,P^r,P^l,\tau\}+\lambda Reg(\xi). \quad (3)$$

In Equation (3), dist may be a distance measure, where dist may be in any type of manifold. The term $\lambda$ may be a Lagrange multiplier to introduce constraints to the optimization model.

The model used by the model optimizer 322 may vary based on the type of image processing application. In a first approach, the model optimization may be for image segmentation, object detection and/or classification problems. In this case, there is a need to discriminate a class or object. The model may use support vector machine (SVM), a decision tree, deep learning, etc. The mathematical model among image sequences for this first approach may be expressed according to Equation (4).

$$\xi^* = \arg\min \text{dist}\{y,\xi(H(\bar{R},\eta),P,\tau)\}, y \in C. \quad (4)$$

In Equation (4), C is the label set and y is the ground-truth label vector and the remaining terms may be defined in accordance with Equation (2).

The output 324 of the model optimizer 322 for this first approach may be an optimal discriminative model. In this approach, the optimal discriminative model may be expressed as $$y = \xi^*(H(\bar{R},\eta),P,\tau \quad (5)$$

In a discriminative model for image segmentation of this first approach, a label may be assigned to each given feature (or associated pixel). A special Markov random fields (MRF) model for unsupervised image segmentation can be described, where $\xi_i \in C$ is the class label set. In this case, $$Estep \ p(\xi | \cdot) = p\{H(\overline{R}, \eta), P, \tau | \xi\} p(\xi), \text{ and} \quad (6)$$

$$Mstep \ p(\xi) = \frac{\sum_{\xi \in C} p(\xi | \cdot)}{|\Omega|}. \quad (7)$$

In Equation (6) and (7), p(ξ|·) is a conditional probability function, Ω is a normalization term and the remaining terms may be defined in accordance with Equation (2).

In a second approach, the model optimization may be for image registration, homography estimation and/or multiple image geometry. For example, a homography estimation of an image registration model may be used to align the given image sequences. The mathematical model among image sequences may be expressed according to Equation (8).

$$\xi^* = \arg\min \ \xi \text{dist}\{H(\overline{R}(I^r), \eta), H(\overline{R}(I^l), \eta) P^r, P^l, \tau\} + \lambda Reg(\xi) \quad (8)$$

In Equation (8), $I^r = \xi^*(I^l)$, where $I^r$ is the intensity from the target image 326b and $I^l$ is the intensity from the source image 326a. λ may be a Lagrange multiplier. The remaining terms may be defined in accordance with Equation (2).

The output of the model optimizer 322 for this second approach may be an optimal transformation. For example, the optimal transformation may include diffeomorphism, homography mapping, a fundamental matrix, an essential matrix, tensors, etc.

In a special case of the second approach, two images 326 are given. A model can be described as follows. Assume $I^r = \xi(I^l)$, where ξ is the transformation. The mathematical model for this case may be expressed as $$\xi^* = \arg\min \ \xi MI\{H(\overline{R}(I^r), \eta), H(\overline{R}(I^l), \eta) P^r, P^l, \tau\} + \lambda Reg(\xi) \quad (9)$$

In Equation (9), "MI" is the mutual information between the two images 326. In Equation (9), $I^r = \xi^*(I^l)$, where $I^r$ is the intensity from the target image 326b and $I^l$ is the intensity from the source image 326a. λ may be a Lagrange multiplier. The remaining terms may be defined in accordance with Equation (2).

In a third approach, the model optimization may be for feature matching. For example, the model may be used to find the correspondence between features in an image sequence. In other words, the model may be used to match the extracted features from image sequences. In this third approach, the mathematical model among image sequences may be expressed according to Equation (10), where i is the index of features extracted from $\overline{R}^r$ and j is the index from features extracted from $\overline{R}^l$.

$$\xi^* = \arg\min_\xi \sum_{ij} \zeta_{ij} dist\{H_i(\overline{R}^r, \eta), H_j(\overline{R}^l, \eta) | P_i^r, P_j^l, \tau\} \quad (10)$$

In Equation (10), $$\{\xi^*\} = \begin{cases} \xi_{ij} = 1 & H_i^r, H_i^l \text{ are associated} \\ \xi_{ij} = 0 & H_i^r, H_i^l \text{ are independent} \end{cases}. \quad (11)$$

It should be noted in Equation (10) that the index associated with the left image is j. When $\xi_{ij}=1$, the $i^{th}$ feature in the target image is matched with $j^{th}$ feature in the source image, or else, the two features are not related. In Equations (9) and (10), the remaining terms may be defined in accordance with Equation (2).

One specific model for an image pair may be expressed as $$\xi^* = \arg\min_\xi \sum_{ij} \zeta_{ij} \|(H_i(\overline{R}^r, \eta) - H_j(\overline{R}^l, \eta)) P_i^l\|^2, \quad (12)$$

where $\xi_{ij} \in \{0,1\}$. When $\xi_{ij}=1$, the features $H_i(\overline{R}^r,\eta)$ and $H_j(\overline{R}^l,\eta)$ are matched. In Equation (12), where i is the index of features extracted from $\overline{R}^r$ and j is the index from features extracted from $\overline{R}^l$. The remaining terms in Equation (12) are defined in accordance with Equation (2).

In a fourth approach, other mathematical models among image sequences may be designed for machine learning, computer vision, image processing and related applications.

Figure 4:
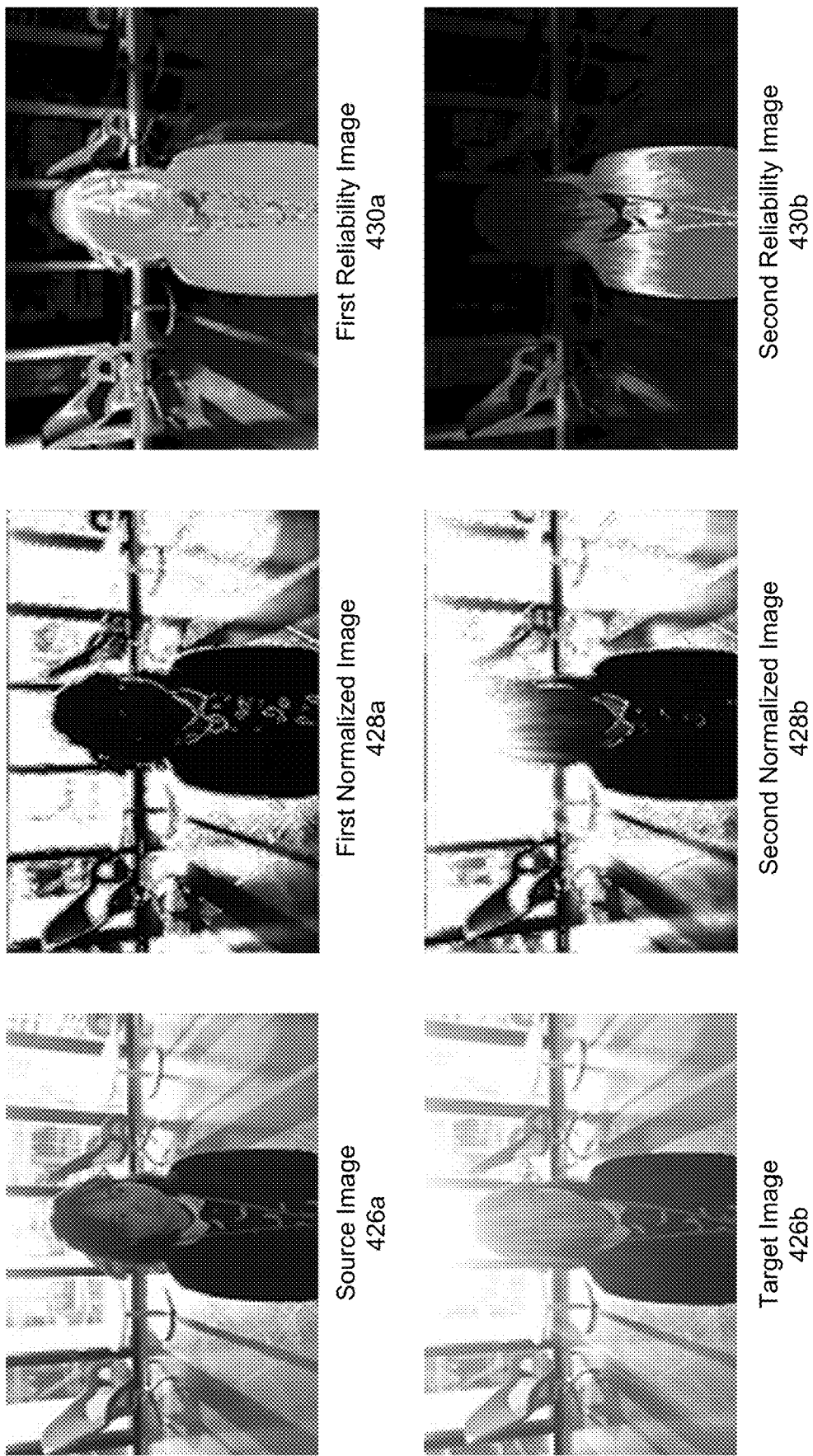
FIG. 4 illustrates examples of normalized radiance and reliability images determined from an image sequence.

FIG. 4 illustrates examples of normalized radiance and reliability images determined from an image sequence. In this example, a source image 426a is captured with normal exposure conditions. The source image 426a may be an RGB image, a grayscale image or other image format. A first normalized radiance 428a may be determined from the source image 426a using a CRF, as described in connection with FIG. 1. A first reliability image 430a may be determined from the source image 426a using a reliability function associated with the CRF. In this example, light regions in the reliability image 430a are more reliable than dark regions.

The target image 426b may also be an RGB image, a grayscale image or other image format. In this example, the target image 426b is over-exposed. In this case, the back lighting from the windows results in the head of the figure in the target image 426b to be washed out. The overexposure conditions lead to great inconsistency between the source image 426a and the target image 426b. However, the inconsistency between the first normalized radiance 428a and the second normalized radiance image 428b decreases compared with the inconsistency between the original source image 426a and target image 426b. Furthermore, in the second reliability image 430b, the head of the figure is a dark region indicating that this is an unreliable region of the normalized radiance image 428b.

As described in connection with FIG. 1, illuminant-invariant model estimation may use the reliability information obtained from a reliability image 430 to optimize a model. For example, the features extracted from the normalized radiance may be weighted by the reliability information obtained from a reliability image 430. Therefore, the model may rely less on features extracted from regions in a normalized radiance image 428 with low reliability due to light-intensity conditions. Conversely, the model may rely more on features extracted from regions in a normalized radiance image 428 with high reliability.

Figure 5:
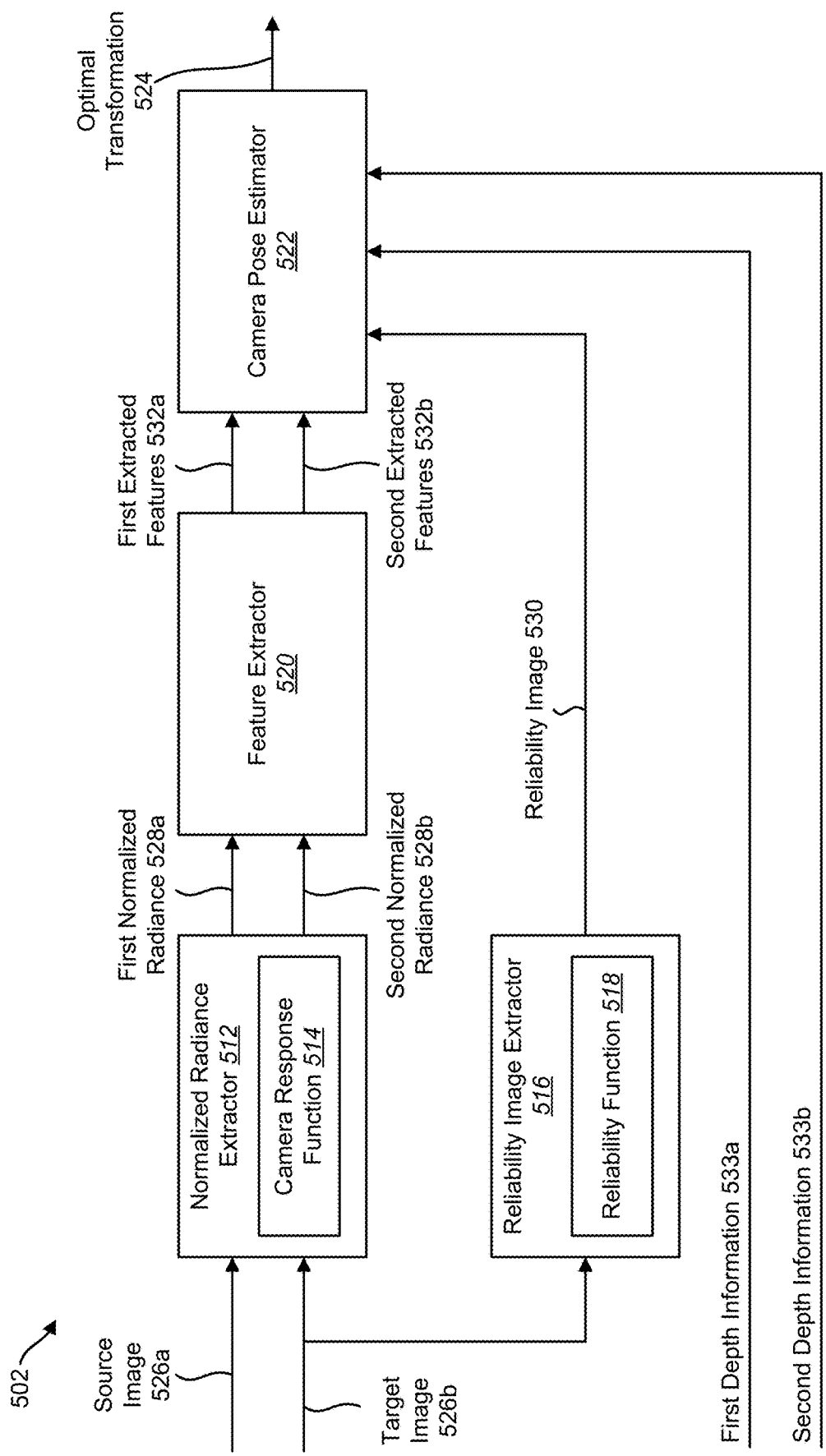
FIG. 5 is a block diagram illustrating an implementation of an electronic device configured to perform illuminant-invariant camera pose estimation.

FIG. 5 is a block diagram illustrating an implementation of an electronic device 502 configured to perform illuminant-invariant camera pose estimation. The electronic device 502 may be implemented in accordance with the electronic device 102 described in connection with FIG. 1 and/or the electronic device 302 described in connection with FIG. 3.

The electronic device 502 may receive a source image 526a and a target image 526b in an image sequence. For example, the electronic device 502 may include one or more cameras (not shown in FIG. 5) that capture an image stream (e.g., a sequence of RGB images, grayscale images, or images of other formats). Alternatively, the electronic device 502 may receive the source image 526a and the target image 526b from a remote camera.

A normalized radiance extractor 512 may receive the source image 526a and the target image 526b. The source image 526a and the target image 526b are provided to the normalized radiance extractor 512, which determines normalized radiance using a camera response function (CRF) 514 and intensity values for each frame.

The normalized radiance extractor 512 may determine a first normalized radiance ($\bar{R}^l$) 528a for the source image 526a based on the CRF 514. The normalized radiance extractor 512 may determine a second normalized radiance ($\bar{R}^r$) 528b for the target image 526b based on the CRF 514.

A feature extractor 520 may receive the first normalized radiance ($\bar{R}^l$) 528a and the second normalized radiance ($\bar{R}^r$) 528b. The feature extractor 520 may extract features from the first normalized radiance ($\bar{R}^l$) 528a and the second normalized radiance ($\bar{R}^r$) 528b. The feature extractor 520 may extract first extracted features 532a from the first normalized radiance ($\bar{R}^l$) 528a. The feature extractor 520 may extract second extracted features 532b from the second normalized radiance ($\bar{R}^r$) 528b.

The feature extraction may be feature extraction mapping or even multiple feature extraction functions, such as SURF, BRISK, ORB, HoG, NCC, etc. The feature extraction mapping may be dense or sparse. The feature extraction mapping may be represented as H (g$\eta$), where "g" is input to the feature extraction mapping and $\eta$ stands for free parameters associated with the mapping function. In an implementation, the feature extractor 520 may determine one or more feature vectors for a given RGB image 526.

A reliability image extractor 516 may determine a reliability image of the target frame based on a reliability function 518 corresponding to the CRF 514. For example, the reliability image extractor 516 may determine a reliability image ($P^r$) 530 corresponding to the target image 526b.

In an implementation, depth information may be obtained for the image sequence. For example, the camera capturing the RGB images may be configured to obtain depth information associated with the RGB images. First depth information 533a may be obtained for the source image 526a. Second depth information 533b may be obtained for the target image 526b.

A camera pose estimator 522 may estimate the pose of the camera based on the features extracted from the normalized radiance, and the reliability image. In an implementation, the camera pose estimator 522 may estimate the pose of the camera by determining an optimal transformation 524 from the source image 526a to the target image 526b. The optimal transformation 524 may be determined using a pose estimation objective function that includes the features extracted from the normalized radiance and the reliability. In some implementations, the pose estimation objective function may also include depth information, as described below.

Estimating the camera pose may include minimizing a pose estimation objective function that includes the extracted features 532, the reliability image 530 and a point-to-plane distance with respect to a transformation 524 of point clouds associated with the image sequence. The pose estimation objective function (also referred to as a dissimilarity metric) may be defined as follows.

$$err = \sum_i \{(H(\bar{R}^r(u_i), \eta) - H(\bar{R}^l(\prod (T(y_i))), \eta))P(I^r(u_i))\}^2 + \quad (13)$$

$$\{(T(y_i) - x_i) \cdot N_{T(y_i)}\}^2$$

In the pose estimation objective function of Equation (13), H(g$\eta$) is any feature mapping (dense or sparse), $\eta$ stands for free parameters associated with the feature extraction mapping function, $y_i$ and $x_i$ are points in a three dimensional point cloud, $u_i$ is a two-dimensional (2D) point. Also in Equation (13), $\Pi$ is a projective function to project a 3D point to two dimensions to locate a corresponding normalized radiance in 2D. The term P($I^r(u_i)$) is the probability obtained from the reliability image 530. The term N is the normal used in the point-to-plane distance. The term T(g) is a spatial transformation.

The pose of the camera may be estimated by minimizing the combination of the illuminant-invariant metric $\{(H(\bar{R}^r(u_i),\eta)-H(\bar{R}^l(\Pi(T(y_i)))\eta))P(I^r(u_i))\}$ and the point-to-plane distance metric $\{(T(y_i)-x_i)\cdot N_T(y_i)\}$ with respect to the spatial transformation T(g). In an implementation, the spatial transformation T(g) is the camera pose if T(g) is defined as a rigid transformation (i.e., global rotation plus translation assuming the scanned object is fixed and the camera moves).

In other implementations, the spatial transformation T(g) can also be defined as other deformation (e.g., non-rigid transformation). In this case, the camera pose may be determined according to a non-rigid registration.

It should be noted that if depth information is not available, the camera pose estimator 522 may still estimate the camera pose using Equation (13). However, in this case, the point-to-plane distance metric $\{(T(y_i)-x_i)\cdot N_T(y_i)\}$ is zero.

In an approach, the normalized radiance may be used as the extracted feature. In this case, H(X,$\eta$)=X. In other words, the feature extractor 520 may output the input normalized radiance. In this case, the dissimilarity metric (i.e., pose estimation objective function) of Equation (13) converts to a simplified version:

$$err = \sum_i \{(\bar{R}^r(u_i) - \bar{R}^l(\prod (T(y_i))))p(I^r(u_i))\}^2 + \{(T(y_i) - x_i) \cdot N_{T(y_i)}\}^2 \quad (14)$$

In Equation (14), the reliability image 530 determined for the target image 526b is used. Therefore, the optimization can be formulated as a least square problem with a closed form solution. Moreover, to use the depth stream (i.e., the first depth information 533a and/or the second depth information 533b) simultaneously as in the RGBD framework, the point-to-plane distance may be added to the dissimilarity metric so that the geometry information is preserved. In an implementation, a Levenberg-Marquardt method may be used to solve this least square problem.

For each image 526, a limited view point cloud may be determined from the camera pose. The illuminant-invariant model estimation may be used to align the point cloud from different views together to determine a complete 3D model of the scanned object.

The optimal transformation (T) 524 may be used to align points in the source image 526a to points in the target image 526b. In Equations (12) and (13), the optimal transformation (T) 524 may be used to transform $y_i$ to $x_i$.

For each image 526, there may be a 3D point cloud corresponding to one or more surfaces. The point cloud for each image 526 may be different based on the position of the camera. The transformation 524 may be used to align the 3D point cloud for two images 526 in an image sequence.

For each frame in the image sequence, each frame (e.g., source) may be registered to a reference frame (e.g., target, pre-chosen) via the aforementioned algorithm. The electronic device 502 may determine a complete 3D reconstruction of an object by aligning the point clouds of the source image 526a and target image 526b using the optimal transformations 524.

The illuminant-invariant pose estimator (registration) can be used for any tracking system where RGBD or RGB (e.g., monocular SLAM) image sequences are originally used to estimate the spatial deformation.

Figure 6:
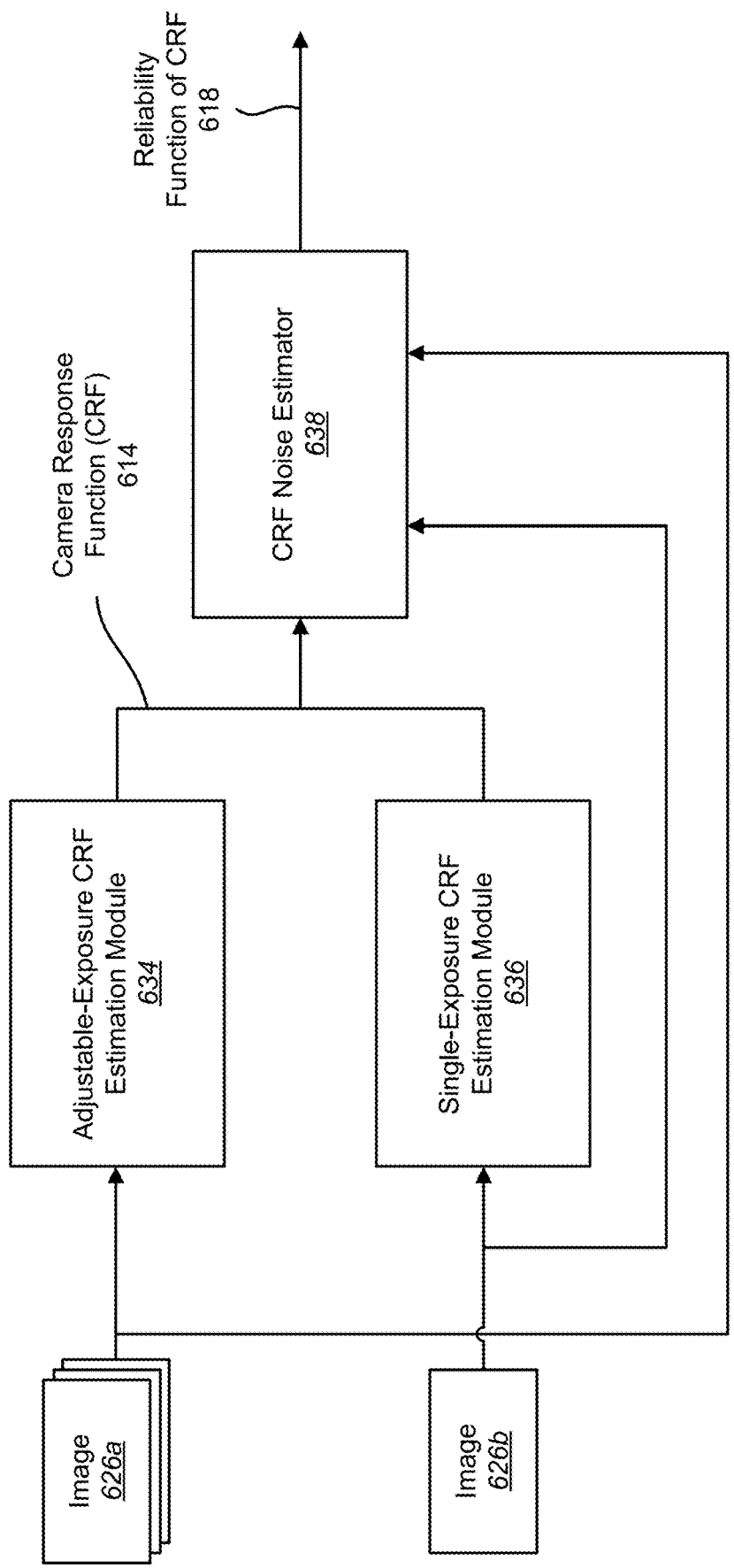
FIG. 6 is a block diagram illustrating one implementation of automatic camera response function (CRF) and reliability function estimation.

FIG. 6 is a block diagram illustrating one implementation of automatic camera response function (CRF) and reliability function estimation. In order to extract illuminant-invariant features, the CRF 614 and its corresponding reliability function 618 need to be learned via a training stage. A novel system to determine the CRF 614 and its associated reliability function 618 for both an exposure-adjustable device and single exposure device is also described.

The algorithm described in connection with FIG. 6 may be implemented by an electronic device 102. The electronic device 102 may be configured with an adjustable-exposure camera or a single-exposure camera. The electronic device 102 may automatically determine the CRF 614 and the reliability function 618 for the configured camera.

In the case of an adjustable-exposure camera, the camera may provide multiple images 626a at various exposures to an adjustable-exposure CRF estimation module 634. As part of the CRF estimation, the adjustable-exposure CRF estimation module 634 may determine the free parameter $\lambda$ of an objective function used for determining the CRF 614.

As discussed above, $I = f(R+n_s(R)+n_c)+n_q$, $R=L\Delta t$, where I is the intensity, R is the radiance, L is the illuminance and $n_s$, $n_c$, $n_q$ are noises contained in the CRF generation model for exposure time t. A quadratic formula to solve this nonlinear mapping follows, with $h = \log f^{-1}$, where $f$ is the CRF 614:

$$err = \sum_{i=1}^{N}\sum_{j=1}^{P}[h(I_{ij}) - \log L_i - \log \Delta t_j]^2 + \lambda \sum_{l=l_{min}+1}^{l_{max}-1} h''(l)^2. \quad (15)$$

In Equation (15), N is the number of pixels, P is the number of different exposure times, i is an intensity index for pixel intensity (I), j is index of exposure time t, and $\lambda$ is the free parameter of the objective function used for determining the CRF 614.

The CRF 614 may be determined by minimizing Equation (15). It is expected that the nonlinear mapping for the CRF 614 is monotonically increasing. The term $\lambda$ plays an important role to balance the data fitting accuracy and monotonically increasing property. If $\lambda$ is too small, the function $f$ may not be monotonically increasing. If $\lambda$ is too large, the resulting camera response function ($f$) 614 will be far away from the ground truth (which may lead to a bad pose estimation, for example). Typically, cross-validation is used to select $\lambda$. However, cross-validation requires a large amount of training data and time.

The algorithm described herein may be used to automatically determine $\lambda$ using only data for CRF estimation. The algorithm is described as follows: the electronic device 102 may calculate the camera response function 614 for each lambda within a lookup table (e.g., chart) using given image data. For example, the $\lambda$ values may be [100, 200, . . . , 900].

For each $\lambda$ value, the electronic device 102 may determine h in Equation (15) using the intensity information from the multiple images 626a.

The algorithm also includes keeping the $\lambda$ where the resulting camera response function 614 monotonically increases. In other words, only the calculated CRFs 614 that have radiance increasing over a range of intensity values are kept. Those CRFs 614 (and associated $\lambda$) that are not monotonically increasing are discarded. An example of a monotonically increasing CRF 614 is described in connection with FIG. 7.

The algorithm further includes determining the A that leads to the minimum residual as defined by Equation (16) or best fits the given data.

$$res = \sum_{i=1}^{N}\sum_{j=1}^{P}[h(I_{ij}) - \log L_i - \log \Delta t_j]^2. \quad (16)$$

In Equation (16), res is the residual. The terms of Equation (16) may be defined in accordance with Equation (15). The electronic device 102 may determine the residual of Equation (16) for each $\lambda$ that results in a monotonically increasing CRF 614. The $\lambda$ with the minimum residual may be selected to determine the final CRF 614.

Figure 8:
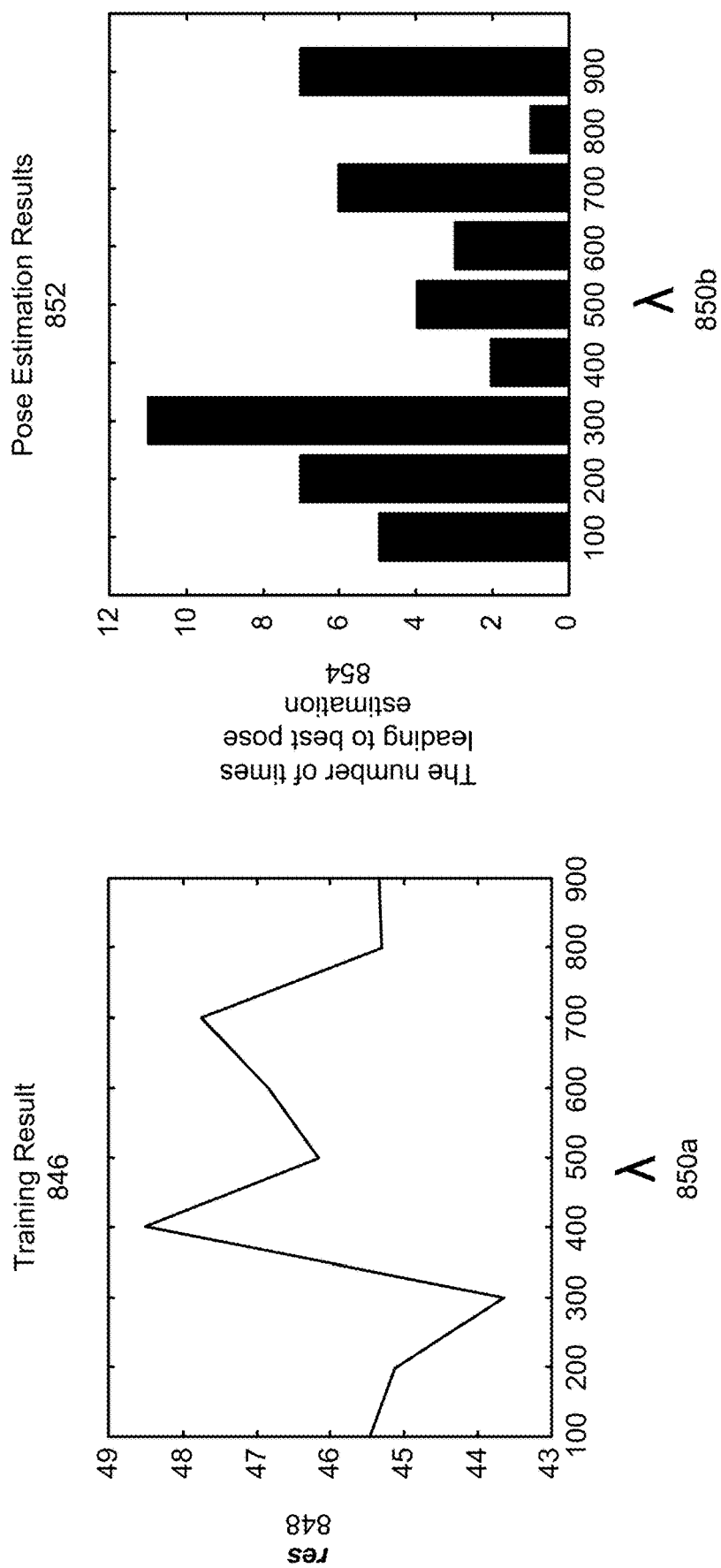
FIG. 8 illustrates examples of training results and pose estimation results for different values of a free parameter ($\lambda$)

Referring to FIG. 8, in the example illustrated in FIG. 8, the $\lambda$ resulting from the algorithm described in connection with FIG. 6 will give the best camera response function for the pose estimation. The training result 846 includes the residual (res) 848 (as determined from Equation (16)) for various values of A 850a. In this example, $\lambda$ 850a is [100, 200, . . . , 900]. The minimum residual 848 occurs when $\lambda$=300.

Also in FIG. 8, the right figure shows pose estimation results 852 using the $\lambda$ 850b and corresponding CRF. The number of times 854 that a given $\lambda$ leads to the best pose estimation is shown for each $\lambda$ used in the training results 846. For example, an electronic device obtains the best 3D pose estimation 852 resulting from the camera response function with $\lambda$=300. Thus, the $\lambda$ determined by the minimum residual is verified to produce the best results.

Referring again to FIG. 6, in the case of a single-exposure camera, the camera may provide a single image 626b at a fixed exposure to a single-exposure CRF estimation module 636. The single-exposure CRF estimation module 636 may determine the free parameter $\lambda$ and CRF 614 as described above for the adjustable-exposure case, but with intensity information from the single image 626b.

A CRF noise estimator 638 may determine the reliability function 618 of the CRF 614. The CRF noise estimator 638 may receive the CRF 614 and the captured image(s) 626. The CRF noise estimator 638 may determine a reliability function 618 based on the CRF 614 and the captured image(s) 626. The reliability function 618 may indicate the probability that radiance estimated from intensity information in the captured image(s) 626 is reliable. An example of the reliability function 618 is described in connection with FIG. 7.

It should be noted that $\lambda$ is used in the CRF estimation. The CRF estimation may be an offline training procedure and only need be done once for each model of camera. The automatically-determined free parameter $\lambda$ used for the CRF estimation algorithm could be used for many high-dynamic-range (HDR) based applications.

Figure 7:
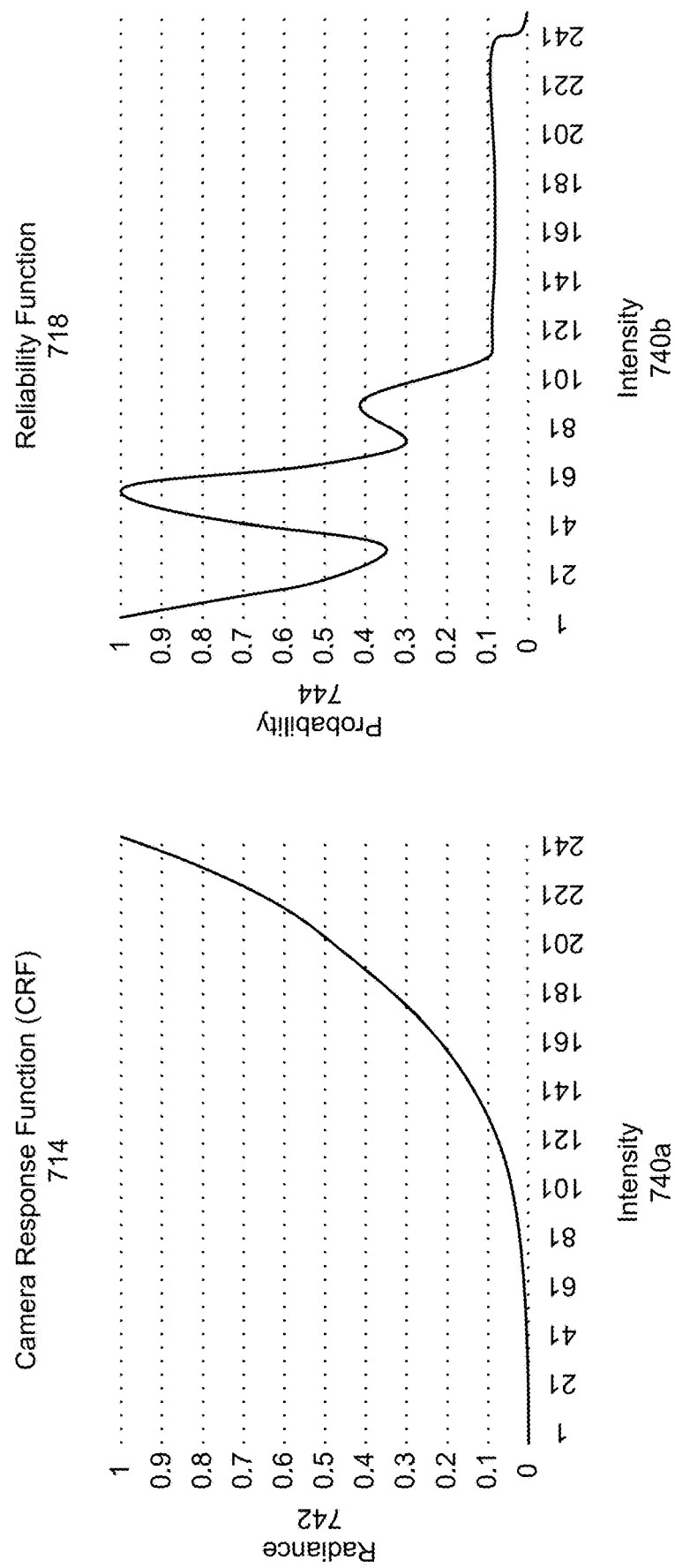
FIG. 7 illustrates an example of a CRF and a corresponding reliability function.

FIG. 7 illustrates an example of a camera response function (CRF) 714 and a corresponding reliability function 718. The CRF 714 provides a radiance 742 for intensity 740$a$ in an image (e.g., RGB image or RGBD image). It should be noted that the CRF 714 depicted in FIG. 7 is monotonically increasing. Low intensity 740$a$ results in low radiance 742, while high intensity 740$a$ results in high radiance 742.

In some implementations, the CRF 714 may be automatically determined by an electronic device, as described in connection with FIG. 6. In other implementations, the CRF 714 may be pre-configured (e.g., downloaded, programmed, etc.) on the electronic device.

The reliability function 718 provides the probability 744 that the estimated radiance 742 of a given pixel as determined from the CRF 714 using the intensity 740$b$ in an image is valid. Because the normalized radiance (R) of a given pixel is based on the estimated radiance 742 of the given pixel (as described by Equation (1)), the reliability function 718 also provides the reliability probability 744 for normalized radiance ($\bar{R}$).

Figure 9:
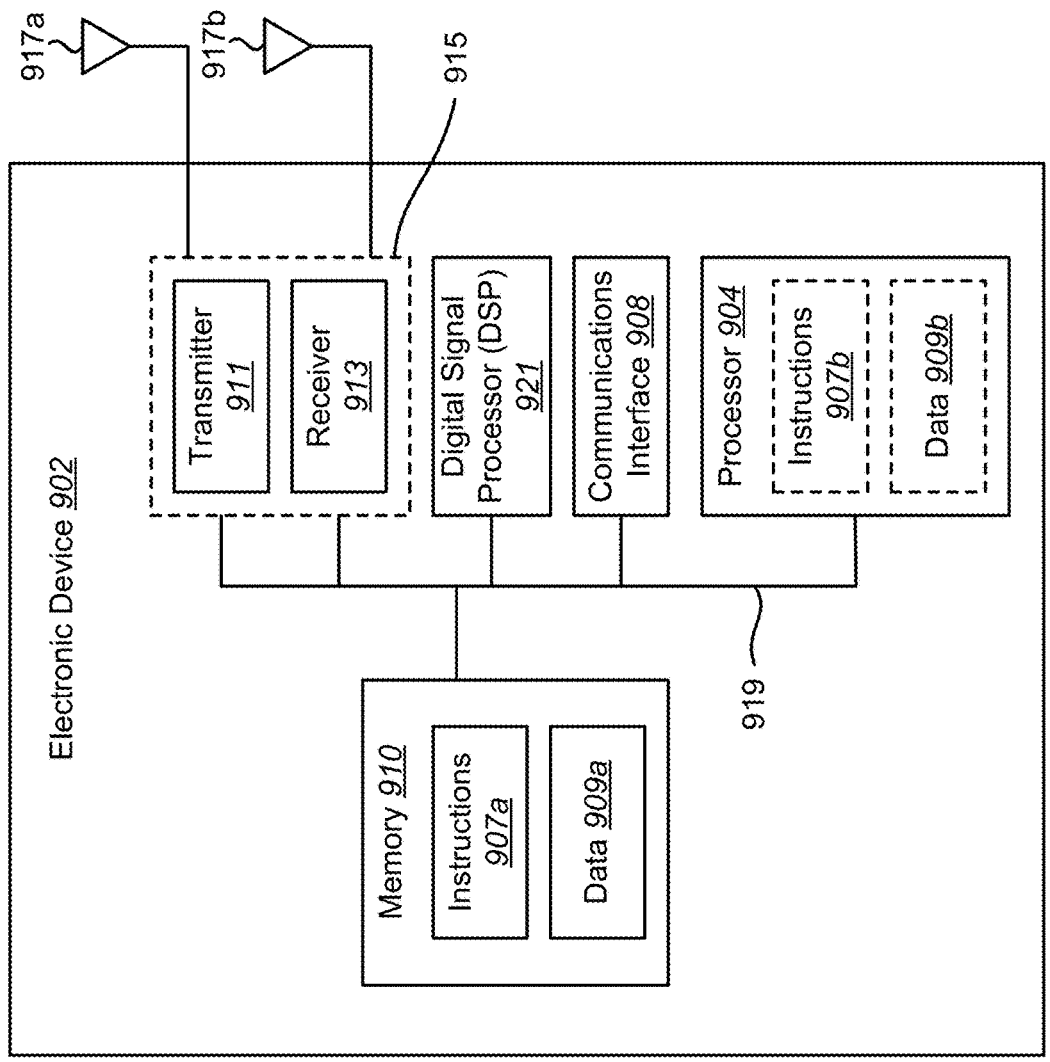
FIG. 9 illustrates certain components that may be included within an electronic device configured to implement various configurations of the systems and methods disclosed herein.

FIG. 9 illustrates certain components that may be included within an electronic device 902 configured to implement various configurations of the systems and methods disclosed herein. The electronic device 902 may be implemented in accordance with one or more of the electronic devices 102, 302, 502 described herein.

The electronic device 902 includes a processor 904. The processor 904 may be a general-purpose single- or multi-chip microprocessor (e.g., an ARM), a special-purpose microprocessor (e.g., a digital signal processor (DSP)), a microcontroller, a programmable gate array, etc. The processor 904 may be referred to as a central processing unit (CPU). Although just a single processor 904 is shown in the electronic device 902, in an alternative configuration, a combination of processors (e.g., an ARM and DSP) could be implemented.

The electronic device 902 also includes memory 910. The memory 910 may be any electronic component capable of storing electronic information. The memory 910 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Data 909$a$ and instructions 907$a$ may be stored in the memory 910. The instructions 907$a$ may be executable by the processor 904 to implement one or more of the methods, procedures, steps, and/or functions described herein. Executing the instructions 907$a$ may involve the use of the data 909$a$ that is stored in the memory 910. When the processor 904 executes the instructions 907, various portions of the instructions 907$b$ may be loaded onto the processor 904 and/or various pieces of data 909$b$ may be loaded onto the processor 904.

The electronic device 902 may also include a transmitter 911 and/or a receiver 913 to allow transmission and reception of signals to and from the electronic device 902. The transmitter 911 and receiver 913 may be collectively referred to as a transceiver 915. One or more antennas 917$a$-$b$ may be electrically coupled to the transceiver 915. The electronic device 902 may also include (not shown) multiple transmitters, multiple receivers, multiple transceivers and/or additional antennas.

The electronic device 902 may include a digital signal processor (DSP) 921. The electronic device 902 may also include a communications interface 908. The communications interface 908 may allow and/or enable one or more kinds of input and/or output. For example, the communications interface 908 may include one or more ports and/or communication devices for linking other devices to the electronic device 902. In some configurations, the communications interface 908 may include the transmitter 911, the receiver 913, or both (e.g., the transceiver 915). Additionally or alternatively, the communications interface 908 may include one or more other interfaces (e.g., touchscreen, keypad, keyboard, microphone, camera, etc.). For example, the communication interface 908 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 919.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method, comprising:
    determining normalized radiance of an image sequence based on a camera response function (CRF);
    determining one or more reliability images of the image sequence based on a reliability function corresponding to the CRF;
    extracting features based on the normalized radiance of the image sequence; and
    optimizing a model based on the extracted features and the reliability images.

2. The method of claim 1, wherein optimizing the model based on the extracted features and the reliability images comprises estimating a camera pose based on the extracted features and the reliability images.

3. The method of claim 2, wherein estimating the camera pose comprises minimizing an objective function that includes the extracted features, the reliability images and a point-to-plane distance with respect to a transformation of point clouds associated with the image sequence.

4. The method of claim 3, wherein the objective function to estimate the camera pose is formulated as a least square system.

5. The method of claim 1, wherein determining normalized radiance of the image sequence based on the CRF comprises:
    determining a first normalized radiance of a source image in the image sequence based on the CRF; and
    determining a second normalized radiance of a target image in the image sequence based on the CRF.

6. The method of claim 5, wherein determining reliability images of the image sequence based on the reliability function corresponding to the CRF comprises:
    determining a first reliability image of the source image in the image sequence based on the reliability function; and
    determining a second reliability image of the target image in the image sequence based on the reliability function.

7. The method of claim 5, wherein extracting features based on the normalized radiance of the image sequence comprises:
    extracting features from the first normalized radiance; and
    extracting features from the second normalized radiance.

8. The method of claim 5, wherein optimizing the model is based on features extracted from the first normalized radiance and the second normalized radiance, a first reliability image associated with the first normalized radiance and a second reliability image associated with the second normalized radiance.

9. The method of claim 1, wherein optimizing the model is further based on depth data from the image sequence.

10. The method of claim 1, wherein the optimal model comprises one of feature matching, homography estimation, image registration, object segmentation or object detection.

11. An electronic device, comprising:
a memory; and
a processor in communication with the memory, the processor configured to:
  determine normalized radiance of an image sequence based on a camera response function (CRF);
  determine one or more reliability images of the image sequence based on a reliability function corresponding to the CRF;
  extract features based on the normalized radiance of the image sequence; and
  optimize a model based on the extracted features and the reliability images.

12. The electronic device of claim 11, wherein optimizing the model based on the extracted features and the reliability images comprises estimating a camera pose based on the extracted features and the reliability images.

13. The electronic device of claim 11, wherein determining normalized radiance of the image sequence comprises:
  determining a first normalized radiance of a source image in the image sequence based on the CRF; and
  determining a second normalized radiance of a target image in the image sequence based on the CRF.

14. The electronic device of claim 13, wherein optimizing the model is based on features extracted from the first normalized radiance and the second normalized radiance, a first reliability image associated with the first normalized radiance and a second reliability image associated with the second normalized radiance.

15. The electronic device of claim 11, wherein optimizing the model is further based on depth data from the image sequence.

16. The electronic device of claim 11, wherein the optimal model comprises one of feature matching, homography estimation, image registration, object segmentation or object detection.

* * * * *